No. 731,033. PATENTED JUNE 16, 1903.
A. O. FREEMAN.
HAND SPRAYER.
APPLICATION FILED JULY 30, 1902.
NO MODEL.
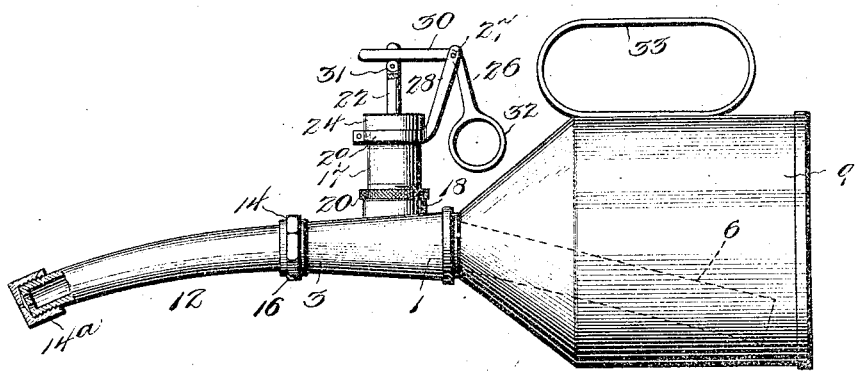
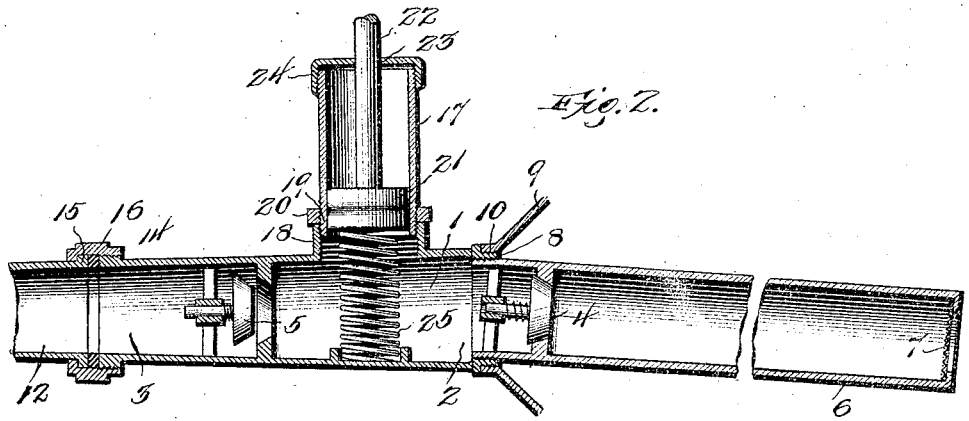
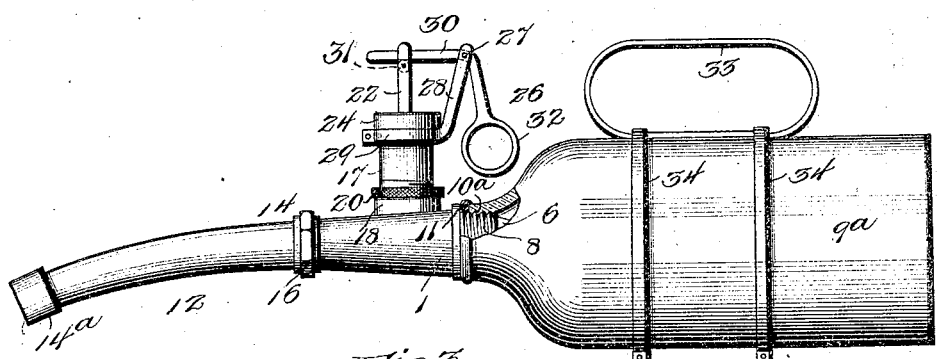
Witnesses
Inventor
Alonzo O. Freeman
by D. T. Wolhaupter
Attorney No. 731,033. Patented June 16, 1903.

UNITED STATES PATENT OFFICE.

ALONZO O. FREEMAN, OF IONIA, MICHIGAN.

HAND-SPRAYER.

SPECIFICATION forming part of Letters Patent No. 731,033, dated June 16, 1903.

Application filed July 30, 1902. Serial No. 117,687. (No model.)

*To all whom it may concern:*

Be it known that I, ALONZO O. FREEMAN, a citizen of the United States, residing at Ionia, in the county of Ionia and State of Michigan, have invented certain new and useful Improvements in Hand-Sprayers, of which the following is a specification.

This invention relates to that type of sprinkling apparatus designed particularly for spraying purposes.

To this end the invention contemplates a simple and practical type of hand-sprayer which can be carried and manipulated with great facility by one hand, while at the same time providing a thoroughly effective spray for any purpose desired.

A further object of the invention is to provide a novel type of hand-sprayer in the form of a complete spraying attachment, which may be utilized in connection with any character of reservoir and which may be readily attached and detached as may be required or desired. In this connection the invention has in view a form of sprayer attachment adapted equally as well to an oil-can form of reservoir as to a fruit-jar type of reservoir, thus rendering the apparatus capable of a wide range of use in connection with different forms of receptacles.

Also the invention has for an object the provision of a sprayer or spraying apparatus embodying operating means controlled by the finger of the same hand supporting or carrying the receptacle, thus enabling the operator to manipulate the sprayer by the finger of the hand which holds the receptacle in any position with the spray-nozzle pointing in any direction.

Another object of the invention is to provide a construction wherein the quantity as well as the force of the spray can be regulated to suit the condition of the work, besides providing an arrangement wherein the pumping action of the spraying apparatus keeps the solution within the reservoir stirred and in the best condition for use.

While the invention possesses special utility as an insect-sprayer for agriculturists and horticulturists, yet at the same time it is useful generally for sprinkling and cleaning purposes.

With these and many other objects in view, which will more readily appear as the nature of the invention is better understood, the same consists in the novel construction, combination, and arrangement of parts, which will be hereinafter more fully described, illustrated, and claimed.

The essential features of the invention involved in the construction of the spraying apparatus, the adjustment thereof, and the operating means therefor are necessarily susceptible to modification without departing from the spirit or scope of the invention, but a preferred embodiment thereof is shown in the accompanying drawings, in which—

Figure 1 is a side elevation of a sprayer attachment constructed in accordance with the present invention and shown applied to an oil-can type of reservoir. Fig. 2 is an enlarged sectional view of the sprayer attachment proper, exposing the detail construction of the pumping mechanism and the operating means therefor. Fig. 3 is an elevation showing the adaptation of the sprayer to a glass jar or equivalent type of reservoir-receptacle.

Like numerals of reference designate corresponding parts throughout the several figures of the drawings.

As already indicated, the type of reservoir-receptacle with which the sprayer attachment is associated is unimportant. Various forms of such receptacles may be employed, but for illustrative purposes there is shown in the drawings two different types of receptacles with which the attachment may be advantageously employed, and as the essential features of the invention are embodied in the construction and arrangement of parts providing for a pumping action of the fluid to be sprayed particular reference will first be made thereto.

As shown in the drawings, the sprayer attachment embodies a pumping mechanism comprising means for drawing the fluid out of the reservoir-receptacle and then distributing it under pressure, by spray, to the point of application. This pumping mechanism includes a tubular fluid-circulating chamber 1, preferably in the form of an extended piece of tubing, and serving to receive the fluid from the reservoir and also to permit of its discharge for circulation out through the sprayproducing element of the attachment. The said tubular circulating-chamber 1 is formed at one end with an inlet-neck 2 and at its correspondingly opposite end with an outlet-neck 3. The said inlet-neck 2 has suitably mounted therein an inwardly-opening check-valve 4, which permits the fluid to freely enter the circulating-chamber 1 and closes in a direction to prevent the backflow of fluid out through the inlet-port of the apparatus. The outlet-neck 3 also has mounted therein an outwardly-opening check-valve 5, which has an opposite action to the valve 4—namely, to permit of the discharge of the fluid from the chamber 1 under the impulse of the pumping action to be presently referred to.

The present invention contemplates associating with the inlet-neck 2 of the pumping mechanism an inlet-pipe 6, detachably or otherwise suitably joined at one end to the said inlet-neck and preferably provided at its opposite end with a strainer or screen 7, providing for straining the impurities from the fluid which is drawn from the pipe 6 into the discharging or circulating chamber 1 of the mechanism, and at this point it will be observed that the said inlet-pipe 6 is also preferably set at an inclination to the longitudinal plane of the tubular circulating-chamber 1, so that the receiving or strainer end 7 of the inlet-pipe will reach well down into the bottom corner of the reservoir-receptacle, especially when the latter is held in a horizontal or inclined position, such as it usually occupies during the spraying of plants and trees.

At the point of connection between the inlet-pipe and the inlet-neck of the circulating-chamber the attachment or pumping mechanism is preferably provided with a screw-coupling cap 8, which is necessarily shaped to adapt the attachment or pumping mechanism to the neck of the particular reservoir-receptacle with which the invention may be associated. In Fig. 1 of the drawings the reservoir-receptacle (designated by the reference-numeral 9) is shown as of the oil-can type, and the threaded opening 10 at the neck thereof is designed to receive a screw-coupling cap 8 in the form of an exteriorly-threaded collar carried by the neck 2 of the chamber 1; but in adapting the attachment to different kinds of receptacles some modification in this part of the same must necessarily be resorted to. For instance, as indicated in Fig. 3 of the drawings, the receptacle 9ª is shown as being in the form of an ordinary glass fruit-jar having a threaded neck 10ª, and the coupling-collar 8 of the attachment is simply enlarged so as to fit this neck, but preferably has associated therewith a gasket or packing-ring 11, interposed between the flange of the collar 8 and the end of the neck 10ª, thus providing a non-leaking joint connection between the attachment and the receptacle, while at the same time permitting the spraying attachment as an entirety to be readily screwed in and out of position. Any suitable provision for filling or venting the reservoir-receptacle may be resorted to without affecting the improvements contemplated by the present invention.

The outlet-neck 3 of the fluid-circulating chamber 1 is designed to have associated therewith a suitable form of spray-nozzle 12. This spray-nozzle is preferably of a curved formation, so that the spraying may be carried on with the sprayer held by the hand in a perfectly natural position. Although any type of spray-nozzle may be obviously employed as a part of the attachment, a form is shown in the drawings with which the nozzle is provided at the end thereof with a spraying rose or head 14ª, while the inner end thereof has a swiveled coupling connection 14 with the inlet neck 3. This swiveled connection may be provided in any suitable way, but preferably by forming the inner end of the nozzle 12 with a flange 15, engaged by a flange of a union-nut 16, threaded upon the end of the outlet-neck 3. The nut 16 may be loosened so as to permit the spray-nozzle to be turned to any position, and when tightened against the flange 15 of said nozzle serves to hold the same rigid as adjusted. This feature permits the nozzle to be turned to spray in any direction that may be desired with the hand in a natural position.

The pumping mechanism has directly associated with the tubular fluid-circulating chamber a pump-cylinder 17. The chamber 1 practically forms the base of the pump-cylinder, and the invention has in view a novel relation between the cylinder and the said chamber, whereby the holding and distributing capacity of the cylinder may be varied to suit the particular objects to be sprayed, and also to provide means whereby not only the amount of spray may be controlled, but also the pressure thereof, which is a very advantageous feature, particularly in the spraying of plants and trees. While this result may be accomplished by different means, a simple expedient is shown in the drawings as consisting in providing an adjustable connection between the pump-cylinder and the circulating-fluid chamber thereof. The adjustable connection referred to is secured by providing the fluid-chamber 1 between the opposite ends thereof with a laterally-offset interiorly-threaded collar 18, adapted to adjustably as well as detachably receive the threaded lower extremity 19 of the pump-cylinder 17. The said threaded portion of the pump-cylinder also may be fitted with a lock nut or ring 20, adapted to work against the collar 18, thereby serving to fasten the cylinder in its adjusted position. It will be obvious that by varying the projection of the pump-cylinder within and out of its circulating-chamber 1 the capacity of the fluid-space of the pumping mechanism is varied, thus necessarily affecting the amount of fluid to be sprayed, as well as the pressure or force under which it is ejected through the spraying-nozzle, by reason of necessarily varying to some extent the play of the piston 21 within the cylinder.

The piston 21, which works within the pump-cylinder 17, is of the valveless or closed type and in the present invention is carried upon the inner end of a piston rod or stem 22, working through a guide-opening 23 in the detachable cap 24, fitting over the outer end of the pump-cylinder. The outstroke of the piston 21 is preferably made automatic through the medium of a coiled operating-spring 25, interposed between the base of the chamber 1 and the inner side of the piston 21. The instroke of the piston is effected through the medium of a finger-operated means controllable by the hand carrying the reservoir-receptacle.

Preferably the operating means referred to includes a finger-lever 26 of a bell-crank type and pivotally mounted between its ends, as at 27, upon a supporting-arm 28, carried by a band 29, detachably clamped upon the cylinder 17 and designed to be loosened up and retightened when the cylinder is adjusted to vary the capacity of the pump, as previously referred to.

The finger-lever 26 at one side of its pivot 27 is formed into a pressure-arm 30, operatively related to the outer end of the piston rod or stem 22. Preferably the outer end of the stem 22 is provided with an antifriction-roller 31 to relieve the pressure of the arm 30, and thus reduces the friction at this point to a minimum. The extremity of the lever 26 opposite its pressure-arm 30 is provided with a pull-ring or handle 32, which is engaged by the finger of the same hand that engages the fixed hand-grip 33, rigid upon one side of the receptacle 9, and having its forward end disposed in convenient proximity to the lever 26, so that the latter may be conveniently grasped. In glass-jar forms of receptacles, such as shown in Fig. 3 of the drawings, the fixed hand-grip 33 is usually held in place through the medium of fastening bands or straps 34, encircling the receptacle and securely bound thereon.

In operating the sprayer it will be observed that a regular pumping action is maintained conjointly through the medium of the finger-lever 26 and the spring 25. On the downstroke of the piston 21 under the influence of the pull on the lever 26 the check-valve 4 is closed, and any fluid in the chamber 1 is forced past the check-valve 5 into and through the spray-nozzle 12. The force of this ejection of the fluid may be controlled largely through the force of the pull upon the finger-lever. On the outstroke of the piston under the influence of the spring 25 the check-valve 5 closes and the valve 4 opens, whereby the fluid may be sucked or drawn through the pipe 6 into the chamber 1. It will thus be seen that irrespective of the character of receptacle that may be employed a complete pumping and spraying action is accomplished and from the same hand that carries the receptacle.

From the foregoing it is thought that the construction, operation, and many advantages the herein-described hand-sprayer will be of readily apparent without further description, and it will also be understood that changes in the form, proportion, and minor details of construction may be resorted to without departing from the spirit of the invention or sacrificing any of the advantages thereof. In this connection it will be understood that while a preferred form of pumping mechanism has been illustrated and described the novel combination involving the fixed hand-grip and the finger-actuated operating means for the pump adjacent thereto may be carried out in connection with different types of pumping mechanism—such, for instance, as a single air-pump, comprising means for forcing the liquid from the reservoir out through the spray-nozzle.

Having thus described the invention, that is claimed, and desired to be secured by Letters Patent, is—

1. In a hand-sprayer, the combination of a reservoir-receptacle having a fixed hand-grip, a sprayer attachment detachably fitted to the receptacle and comprising a fluid-circulating chamber arranged to constitute the spout of the receptacle, a spray-nozzle carried by the circulating-chamber as a continuation thereof, and a pumping mechanism offset laterally from an intermediate point of the circulating-chamber and including a spring-projected piston-rod, and a pivotally-supported finger-lever sustained by the pump-cylinder and having separate members coöperating respectively with the piston-rod and the fixed hand-grip of the receptacle.

2. In a hand-sprayer, the combination with the reservoir-receptacle having a fixed hand-grip, a valved circulating-chamber arranged as the spout for the receptacle and provided at one end with an inlet-pipe extending into the latter, a spray-nozzle fitted to the outer end of the circulating-chamber as a continuation thereof, a pump-cylinder projected from the side of the circulating-chamber between the valves thereof, a piston working within the cylinder, a spring located within the circulating-chamber and bearing against the piston, and a pivotally-supported finger-lever sustained by the pump-cylinder and having a pressure-arm coöperating with the piston, said lever also having a member disposed in operative relation to the fixed hand-grip.

3. In a hand-sprayer, the combination with the reservoir-receptacle having a fixed hand-grip, a valved fluid-circulating chamber detachably fitted to the reservoir-receptacle and provided at one end with an inlet-pipe extending into said receptacle and at its other end with a spray-nozzle, a pump-cylinder fitted to said chamber between the valves thereof, a piston working in said cylinder and having a rod or stem projecting outside of the same, a spring arranged to move the piston in an outward direction, and a pivotally-supported finger-lever sustained by the pump-cylinder and provided with a pressure-arm having an antifriction-roller-bearing engagement with the piston-rod or stem, the pull end of said lever being disposed in proximity to said hand-grip.

In testimony whereof I affix my signature in presence of two witnesses.

ALONZO O. FREEMAN.

Witnesses:
  C. O. THOMPSON,
  LOUIS THOMPSON.